US012628867B2

(12) United States Patent
Lee et al.

(10) Patent No.: US 12,628,867 B2
(45) Date of Patent: May 19, 2026

(54) AEROSOL GENERATING DEVICE AND METHOD OF OPERATING THE SAME

(71) Applicant: KT&G CORPORATION, Daejeon (KR)

(72) Inventors: Wonkyeong Lee, Gyeonggi-do (KR); Heon Jun Jeong, Seoul (KR); Dong Sung Kim, Seoul (KR); Jae Sung Choi, Gyeonggi-do (KR)

(73) Assignee: KT&G CORPORATION, Daejeon (KR)

(*) Notice: Subject to any disclaimer, the term of this patent is extended or adjusted under 35 U.S.C. 154(b) by 937 days.

(21) Appl. No.: 17/762,421

(22) PCT Filed: Nov. 16, 2021

(86) PCT No.: PCT/KR2021/016721
§ 371 (c)(1),
(2) Date: Mar. 22, 2022

(87) PCT Pub. No.: WO2022/124613
PCT Pub. Date: Jun. 16, 2022

(65) Prior Publication Data

US 2024/0049780 A1 Feb. 15, 2024

(30) Foreign Application Priority Data

Dec. 9, 2020 (KR) ........................ 10-2020-0171718
Jan. 27, 2021 (KR) ........................ 10-2021-0011798

(51) Int. Cl.

| | |
|---|---|
| ***A24F 40/05*** | (2020.01) |
| ***A24F 40/50*** | (2020.01) |
| ***B06B 1/02*** | (2006.01) |

(52) U.S. Cl.
CPC .............. *A24F 40/05* (2020.01); *A24F 40/50* (2020.01); *B06B 1/0253* (2013.01); *B06B 2201/55* (2013.01)

(58) Field of Classification Search
None
See application file for complete search history.

(56) References Cited

U.S. PATENT DOCUMENTS 8,074,896 B2 12/2011 Ricciardi et al.
10,349,674 B2 7/2019 Sur
(Continued)

FOREIGN PATENT DOCUMENTS

CN 203421793 U 2/2014
CN 205052879 U 3/2016
(Continued)

OTHER PUBLICATIONS

International Search Report of PCT/KR2021/016721 dated Feb. 28, 2022 [PCT/ISA/210].
(Continued)

*Primary Examiner* — Philip Y Louie
*Assistant Examiner* — John Mitchell Martin
(74) *Attorney, Agent, or Firm* — Sughrue Mion, PLLC

(57) ABSTRACT

An aerosol generating device includes a vibrator configured to vibrate to generate an aerosol from an aerosol generating material, a controller configured to control the vibrator to vibrate at a target vibration speed, and a feedback circuit configured to detect an electrical signal representing a frequency response of the vibrator that changes according to an operating environment of the vibrator and output a feedback signal based on the detected electrical signal, and the controller may adjust the vibration speed of the vibrator based on the feedback signal output from the feedback circuit.

7 Claims, 6 Drawing Sheets

(56) References Cited

U.S. PATENT DOCUMENTS

| | | | |
|---|---|---|---|
| 11,431,242 | B2 | 8/2022 | Liu et al. |
| 11,583,007 | B2 | 2/2023 | Lee et al. |
| 2017/0048927 | A1* | 2/2017 | Murison ................. A24F 40/50 |
| 2017/0119059 | A1 | 5/2017 | Zuber et al. |
| 2019/0014819 | A1 | 1/2019 | Sur |
| 2019/0246701 | A1 | 8/2019 | Nakano et al. |
| 2019/0350257 | A1 | 11/2019 | Sur |
| 2019/0351370 | A1* | 11/2019 | Frühauf ................ B05B 7/0475 |
| 2020/0060337 | A1 | 2/2020 | Liu et al. |
| 2020/0146353 | A1 | 5/2020 | Liu et al. |
| 2020/0237009 | A1 | 7/2020 | Akao et al. |
| 2020/0352244 | A1 | 11/2020 | Lim et al. |
| 2021/0000184 | A1* | 1/2021 | Moloney ................. A24F 40/57 |
| 2022/0183377 | A1* | 6/2022 | Blandino ................ A24F 40/57 |
| 2022/0240585 | A1* | 8/2022 | Horrod .................... H05B 6/06 |
| 2024/0123167 | A1* | 4/2024 | Alshaiba Saleh Ghannam Almazrouei ........ B05B 17/0669 |

FOREIGN PATENT DOCUMENTS

| | | | |
|---|---|---|---|
| CN | 207383536 | U | 5/2018 |
| CN | 108135274 | A | 6/2018 |
| CN | 110418582 | A | 11/2019 |
| CN | 110892787 | A | 3/2020 |
| CN | 111685394 | A | 9/2020 |
| EP | 3299053 | A1 | 3/2018 |
| EP | 3569078 | A1 | 11/2019 |
| EP | 3788894 | A1 | 3/2021 |
| JP | 2020-509738 | A | 4/2020 |
| KR | 10-1829752 | B1 | 2/2018 |
| KR | 10-2020-0031651 | A | 3/2020 |
| KR | 10-2021-0150935 | A | 12/2021 |
| WO | 2015/177257 | A1 | 11/2015 |
| WO | 2017/137512 | A1 | 8/2017 |
| WO | 2018/153171 | A1 | 8/2018 |
| WO | 2019238062 | A1 | 12/2019 |

OTHER PUBLICATIONS

Written Opinion of PCT/KR2021/016721 dated Feb. 28, 2022 [PCT/ISA/237].

Communication dated Jul. 8, 2024, issued in Chinese Application No. 202180006285.8.

Korean Office Action dated Sep. 26, 2022 in Korean Application No. 10-2021-0011798.

Extended European Search Report dated Oct. 28, 2022 in European Application No. 21870530.9.

Notification of Reasons for Refusal dated Apr. 4, 2023 from the Japanese Patent Office in application No. 2022-525110.

* cited by examiner

AEROSOL GENERATING DEVICE AND METHOD OF OPERATING THE SAME

CROSS REFERENCE TO RELATED APPLICATIONS

This application is a National Stage of International Application No. PCT/KR2021/016721 filed on Nov. 16, 2021, claiming priority based on Korean Patent Application No. 10-2020-0171718 filed on Dec. 9, 2020 and Korean Patent Application No. 10-2021-0011798 filed on Jan. 27, 2021.

TECHNICAL FIELD

Embodiments relate to an aerosol generating device and a method of operating the aerosol generating device.

BACKGROUND ART

In recent years, there has been an increasing demand for an alternative method that overcomes disadvantages of general cigarettes. For example, there is an increasing demand for a method of generating aerosols by heating aerosol generating materials, rather than by burning cigarettes. Accordingly, studies on heating-type aerosol generating devices or ultrasonic vibration-type aerosol generating devices are actively being conducted.

DISCLOSURE OF INVENTION

Technical Problem

In the case of ultrasonic vibration-type aerosol generating devices, a frequency response of a vibrator may change, resulting in the inconsistent amount of atomization. Therefore, there is a need for technology that provides a consistent amount of atomization despite the varying frequency response of the vibrator.

Various embodiments provide an aerosol generating device and a method of operating the aerosol generating device. Technical problems to be solved by the present disclosure are not limited to the technical problems described above, and other technical problems may be inferred from following embodiments.

Solution to Problem

According to one aspect, an aerosol generating device may include a vibrator configured to vibrate at different vibration speeds according to a frequency of a supply voltage; a feedback circuit configured to detect an electrical signal representing a frequency response of the vibrator that changes according to an operating environment of the vibrator, and output a feedback signal based on the detected electrical signal; and a controller configured to adjust the frequency of the supply voltage based on the feedback signal such that the vibrator vibrates at a target vibration speed regardless of a change in the frequency response of the vibrator.

According to another aspect, a method of operating an aerosol generating device may include detecting an electrical signal representing a frequency response of a vibrator that changes according to an operating environment of the vibrator; outputting a feedback signal based on the detected electrical signal; determining a frequency of a voltage supplied to the vibrator that causes the vibrator to vibrate at a target vibration speed based on the output feedback signal; and adjusting the voltage supplied to the vibrator according to the determined frequency.

According to another aspect, a non-transitory computer-readable recording medium having a program recorded thereon for a computer to execute the method described above.

Advantageous Effects of Invention

According to the above description, even when there is a change in frequency response of a vibrator, a constant amount of constant atomization may be provided to a user, and thus a user's sense of smoking may be improved.

Effects of embodiments are not limited to the effects described above, and effects not described will be clearly understood by those skilled in the art to which the present disclosure pertains from the present specification and the accompanying drawings.

BEST MODE FOR CARRYING OUT THE INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

Figure 1:
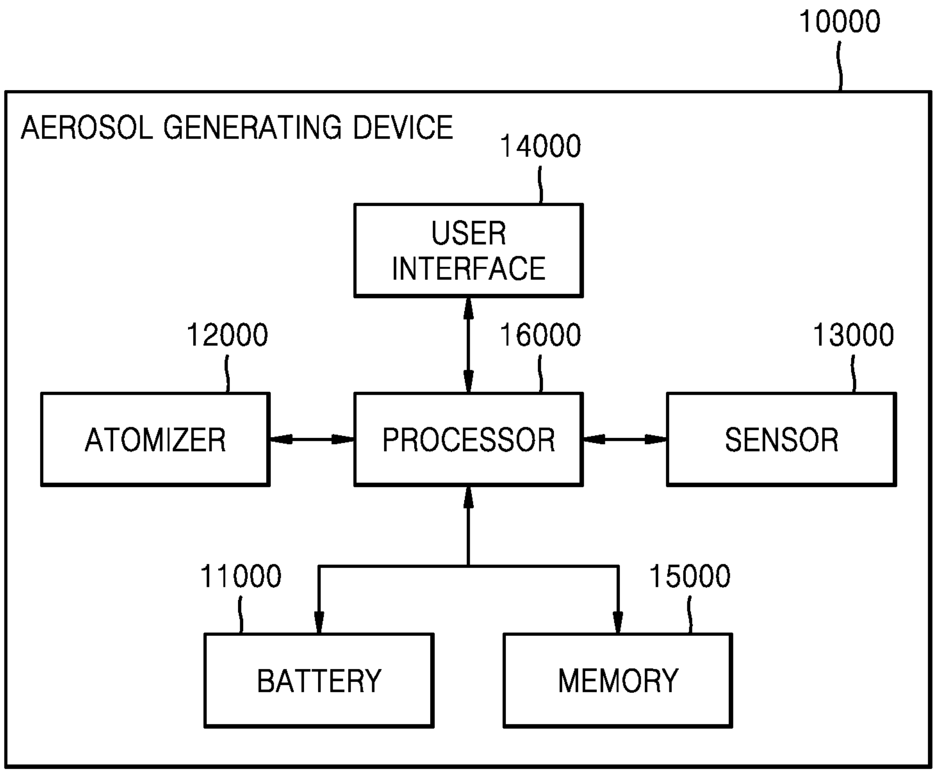
FIG. 1 is a block diagram of an aerosol generating device according to an embodiment.

FIG. 1 is a block diagram of an aerosol generating device according to an embodiment.

Referring to FIG. 1, an aerosol generating device 10000 may include a battery 11000, an atomizer 12000, a sensor 13000, a user interface 14000, a memory 15000, and a processor 16000. An internal structure of the aerosol generating device 10000 is not limited to the structure illustrated in FIG. 1. Those skilled in the art related to the present embodiment may understand that part of a hardware configuration illustrated in FIG. 1 may be omitted or a new configuration may be added thereto according to a design of the aerosol generating device 10000.

In one example, the aerosol generating device 10000 may include a main body, and in this case, hardware elements included in the aerosol generating device 10000 may be included in the main body.

In another embodiment, the aerosol generating device 10000 may include a main body and a cartridge, and hardware components of the aerosol generating device 10000 may be arranged across the main body and the cartridge. Alternatively, at least some of the hardware components of the aerosol generating device 10000 may be included in each of the main body and the cartridge.

Hereinafter, an operation of each component will be described without limiting spaces in which the respective components included in the aerosol generating device 10000 are located.

The battery 11000 may supply electric power used to operate the aerosol generating device 10000. That is, the battery 11000 may supply electric power such that the atomizer 12000 may atomize an aerosol generating material. In addition, the battery 11000 may supply electric power required for operations of other hardware components included in the aerosol generating device 10000, that is, the sensor 13000, the user interface 14000, the memory 15000, and the processor 16000. The battery 11000 may be a rechargeable battery or a disposable battery.

For example, the battery 11000 may include a nickel-based battery (for example, a nickel-metal hydride battery or a nickel-cadmium battery) or a lithium-based battery (for example, a lithium-cobalt battery, a lithium-phosphate battery, a lithium-titanate battery, a lithium-ion battery or a lithium-polymer battery). However, the type of the battery 11000 that may be used in the aerosol generating device 10000 is not limited to the battery described above. The battery 11000 may also include an alkaline battery or a manganese battery as necessary.

The atomizer 12000 may receive electric power from the battery 11000 under the control of the processor 16000. The atomizer 12000 may receive electric power from the battery 11000 to atomize an aerosol generating material stored in the aerosol generating device 10000.

The atomizer 12000 may be included in a main body of the aerosol generating device 10000. Alternatively, when the aerosol generating device 10000 includes the main body and a cartridge, the atomizer 12000 may be included in the cartridge or may be divided to be included in the main body and the cartridge. When the atomizer 12000 is included in the cartridge, the atomizer 12000 may receive electric power from the battery 11000 included in at least one of the main body and the cartridge. In addition, when the atomizer 12000 is divided to be included in the main body and the cartridge, components of the atomizer 12000 that require electric power may receive the electric power from the battery 11000 included in at least one of the main body and the cartridge.

The atomizer 12000 generates an aerosol from an aerosol generating material included in the cartridge. The aerosol indicates a suspension of liquid droplets and/or fine solid particles dispersed in a gas. Therefore, an aerosol generated from the atomizer 12000 may indicate a mixture in which vaporized particles generated from the aerosol generating material are mixed with air. For example, the atomizer 12000 may convert a phase of an aerosol generating material into a gas phase through vaporization and/or sublimation. In addition, the atomizer 12000 may generate an aerosol by dividing an aerosol generating material in a liquid phase and/or a solid phase into fine particles and discharging the fine particles.

For example, the atomizer 12000 may generate an aerosol from an aerosol generating material by using an ultrasonic vibration method. The ultrasonic vibration method may refer to a method of generating an aerosol by atomizing an aerosol generating material with ultrasonic vibrations generated by a vibrator.

The aerosol generating device 10000 may include at least one sensor 13000. A result sensed by the at least one sensor 13000 may be transmitted to the processor 16000, and according to the sensed result, the processor 16000 may control the aerosol generating device 10000 to perform various functions, such as an operation of the atomizer 12000, limitation of smoking, determination about whether or not a cartridge (or cigarette) is inserted, and notification display.

For example, the at least one sensor 13000 may include a puff detection sensor. The puff detection sensor may detect a user's puff based on at least one of a change in air flow rate, a change in pressure, and detection of sound. The puff detection sensor may detect a start timing and an end timing of the user's puff, and the processor 16000 may determine a puff period and a non-puff period according to the detected start timing and end timing of the puff.

In addition, the at least one sensor 13000 may include a user input sensor. The user input sensor may include a sensor capable of receiving an input of a user, such as a switch, a physical button, or a touch sensor. For example, the touch sensor may include a capacitive sensor capable of detecting the input of the user by detecting a change in capacitance that is generated when a user touches a certain region formed of a metal material. The processor 16000 may detect the input of the user based on a change in capacitance received from the capacitive sensor. When the change in capacitance exceeds a preset threshold, the processor 16000 may determine that there is the input of the user.

In addition, the at least one sensor 13000 may include a motion sensor. Information on a motion of the aerosol generating device 10000, such as inclination, movement speed, and acceleration of the aerosol generating device 10000 may be acquired by the motion sensor. For example, the motion sensor may detect information on a moving state of the aerosol generating device 10000, a stationary state of the aerosol generating device 10000, a state in which the aerosol generating device 10000 is inclined at an angle within a certain angle range for puff, and a state in which the aerosol generating device 10000 is inclined at an angle outside the angle range for puff between respective puff actions. The motion sensor may detect motion information of the aerosol generating device 10000 by using various methods known in the art. For example, the motion sensor may include an acceleration sensor capable of detecting acceleration in three directions of an x-axis direction, a y-axis direction, and a z-axis direction, and a gyro sensor capable of detecting angular velocity in the three directions.

In addition, the at least one sensor 13000 may include a proximity sensor. The proximity sensor may refer to a sensor that detects presence or absence of or a distance with an approaching object or an object existing in the vicinity without mechanical contact by using a force of an electromagnetic field, infrared rays, or so on, and through this, the proximity sensor may detect whether or not a user approaches the aerosol generating device 10000.

In addition, the at least one sensor 13000 may include a consumable detachment sensor capable of detecting attachment or detachment of a consumable (for example, a cartridge or cigarette) that may be used in the aerosol generating device 10000. For example, the consumable detachment sensor may detect whether or not a consumable is in contact with the aerosol generating device 10000. As another example, the consumable detachment sensor may determine whether the consumable is attached to or detached from the aerosol generating device 10000 by using an image sensor. In addition, the consumable detachment sensor may include an inductance sensor that detects a change in an inductance value of a coil that may interact with a marker of a consumable, or a capacitance sensor that detects a change in a capacitance value of a capacitor that may interact with the marker of the consumable.

In addition, the at least one sensor 13000 may include various sensors that detect information on a surrounding environment of the aerosol generating device 10000. For example, the at least one sensor 13000 may include a temperature sensor that may detect a temperature of a surrounding environment, a humidity sensor that may detect humidity of the surrounding environment, an atmospheric pressure sensor that may detect a pressure of the surrounding environment, and so on.

The sensor 13000 that may be provided in the aerosol generating device 10000 is not limited to the sensors described above and may further include various sensors. For example, the aerosol generating device 10000 may include a fingerprint sensor capable of acquiring fingerprint information from a user's finger for user authentication and security, an iris recognition sensor that analyzes an iris pattern of a pupil, a vein recognition sensor that detects the amount of infrared absorption of returned hemoglobin in the vein from an image of the palm, a facial recognition sensor that recognizes feature points of eyes, nose, mouth, facial contours, and so on by using a two-dimensional method or a three-dimensional method, a radio frequency identification (RFID) sensor, and so on.

The aerosol generating device 10000 may selectively implement only some of examples of the various sensors 13000 described above. In other words, the aerosol generating device 10000 may combine and utilize information detected by at least one of the sensors described above.

The user interface 14000 may provide the user with information about the state of the aerosol generating device 10000. The user interface 14000 may include various interfacing devices, such as a display or a lamp for outputting visual information, a motor for outputting haptic information, a speaker for outputting sound information, input/output (I/O) interfacing devices (for example, a button or a touch screen) for receiving information input from the user or outputting information to the user, terminals for performing data communication or receiving charging power, and communication interfacing modules for performing wireless communication (for example, Wi-Fi, Wi-Fi direct, Bluetooth, near-field communication (NFC), etc.) with external devices.

However, the aerosol generating device 10000 may be implemented by selecting only some of the above-described various interfacing devices.

The memory 15000, as a hardware component configured to store various pieces of data processed in the aerosol generating device 10000, may store data processed or to be processed by the controller 16000. The memory 15000 may include various types of memories, such as random access memory, such as dynamic random access memory (DRAM), static random access memory (SRAM), etc., read-only memory (ROM), electrically erasable programmable read-only memory (EEPROM), etc.

The memory 15000 may store an operation time of the aerosol generating device 10000, the maximum number of puffs, the current number of puffs, at least one temperature profile, data on a user's smoking pattern, etc.

The processor 16000 may generally control operations of the aerosol generating device 10000. The processor 16000 can be implemented as an array of a plurality of logic gates or can be implemented as a combination of a general-purpose microprocessor and a memory in which a program executable in the microprocessor is stored. It will be understood by one of ordinary skill in the art that the processor 16000 can be implemented in other forms of hardware.

The processor 16000 analyzes a result of the sensing by at least one sensor 13000, and controls the processes that are to be performed subsequently.

The processor 16000 may control electric power supplied to the atomizer 12000 to start or end an operation of the atomizer 12000 based on a result sensed by the at least one sensor 13000. In addition, the processor 16000 may control the electric power supplied to the atomizer 12000 and time during which the electric power is supplied such that the atomizer 12000 may generate an appropriate amount of aerosol based on the result sensed by the at least one sensor 13000 For example, the processor 16000 may control a current or voltage supplied to a vibrator such that the vibrator of the atomizer 12000 vibrates at a certain frequency.

In one embodiment, the processor 16000 may start an operation of the atomizer 12000 after receiving an input of a user for the aerosol generating device 10000. In addition, the processor 16000 may start the operation of the atomizer 12000 after detecting a user's puff by using a puff detection sensor. In addition, the processor 16000 may stop supplying electric power to the atomizer 12000 when the number of puffs reaches a preset number after counting the number of puffs by using the puff detection sensor.

The processor 16000 may control the user interface 1100000 based on a result sensed by the at least one sensor 13000. For example, when the number of puffs reaches a preset number after counting the number of puffs by using the puff detection sensor, the processor 16000 may use at least one of a lamp, a motor, and a speaker to inform a user that the aerosol generating device 10000 will be terminated soon.

In addition, although not illustrated in FIG. 1, the aerosol generating device 10000 may also be included in an aerosol generating system together with a separate cradle. For example, the cradle may be used to charge the battery 11000 of the aerosol generating device 10000. For example, the aerosol generating device 10000 may receive electric power from a battery of a cradle to charge the battery 11000 of the aerosol generating device 10000 in a state of being accommodated in an accommodation space in the cradle.

Figure 2:
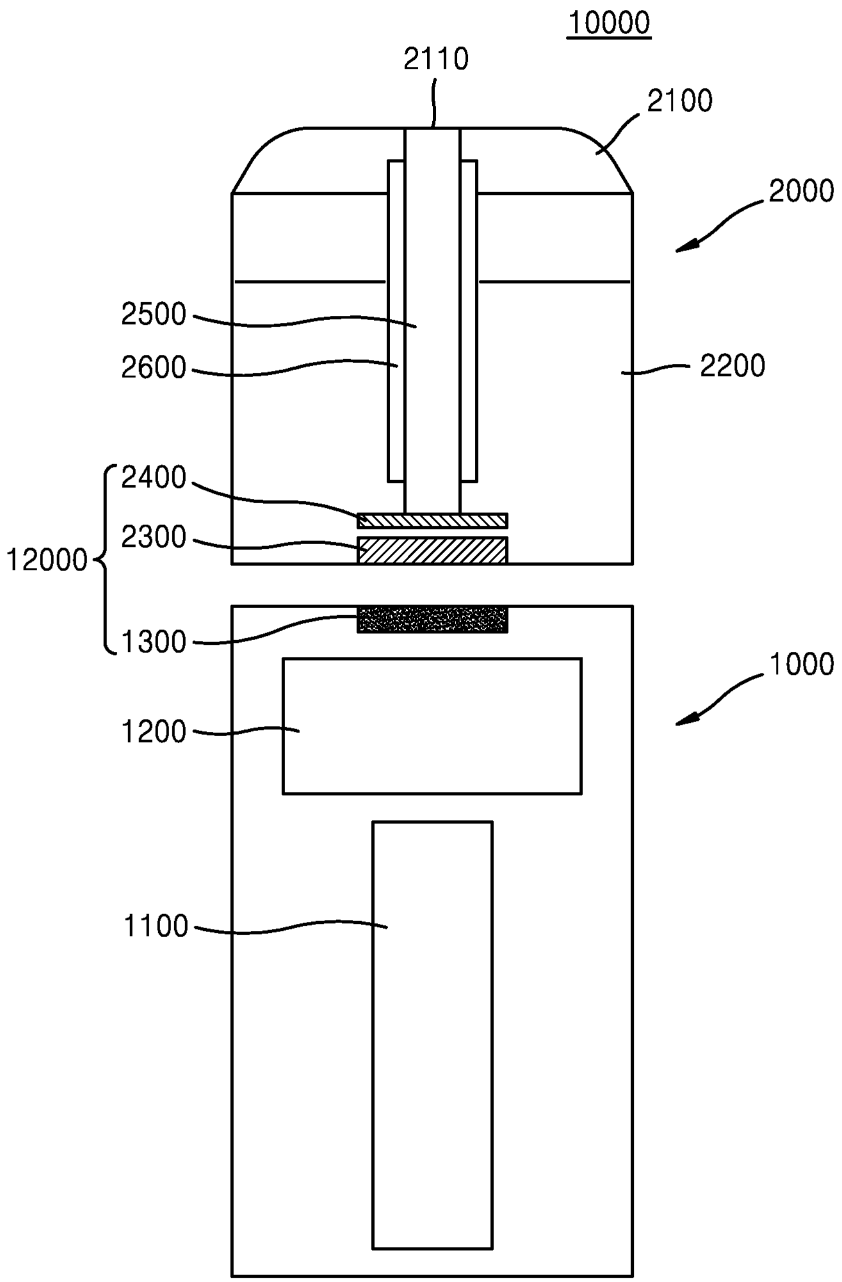
FIG. 2 is a view schematically illustrating the aerosol generating device illustrated in FIG. 1.

FIG. 2 is a view schematically illustrating an aerosol generating device according to an embodiment.

The aerosol generating device 10000 according to the embodiment illustrated in FIG. 2 includes a cartridge 2000 accommodating an aerosol generating material, and a main body 1000 supporting the cartridge 2000.

The cartridge 2000 accommodating an aerosol generating material may be coupled to the body 1000. For example, a part of the cartridge 2000 may be inserted into the main body 1000 or a part of the main body 1000 may be into the cartridge 2000 such that the cartridge 2000 may be mounted on the main body 1000. In this case, the main body 1000 may be coupled to the cartridge 2000 by using a snap-fit method, a screw coupling method, a magnetic coupling method, an interference fit method, or so on, but a method of coupling the body 1000 to the cartridge 2000 is not limited to the methods described above.

The cartridge 2000 may include a mouthpiece 2100. The mouthpiece 2100 may be formed at an end portion of the cartridge 2000 which is opposite to another end portion coupled to the main body 1000 so that the mouthpiece 2100 may be inserted into a user's oral cavity. The mouthpiece 2100 may include a discharge hole 2110 for discharging an aerosol generated from the aerosol generating material in the cartridge 2000 to the outside.

The cartridge 2000 may contain an aerosol generating material in any one of, for example, a liquid state, a solid state, a gaseous state, or a gel state. The aerosol generating material may include a liquid composition. For example, the liquid composition may be a liquid including a tobacco-containing material having a volatile tobacco flavor component, or a liquid including a non-tobacco material.

For example, the liquid composition may include one component of water, solvents, ethanol, plant extracts, spices, flavorings, and vitamin mixtures, or a mixture of these components. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for the formation of the nicotine salts may be appropriately selected in consideration of the rate of nicotine absorption in the blood, the operating temperature of the aerosol generating device 10000, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The cartridge 2000 may include a liquid storage 2200 accommodating the aerosol generating material therein. When the liquid storage 2200 "accommodates the aerosol generating material" therein, it means that the liquid storage 2200 functions as a container simply holding an aerosol generating material and that the liquid storage 2200 includes therein an element impregnated with (or containing) an aerosol generating material, such as a sponge, cotton, fabric, or porous ceramic structure.

The aerosol generating device 10000 may include an atomizer 12000 that converts a phase of the aerosol generating material in the cartridge 2000 to generate an aerosol.

For example, the atomizer 12000 of the aerosol generating device 10000 may convert a phase of an aerosol generating material by using an ultrasonic vibration method of atomizing the aerosol generating material with ultrasonic vibrations. The atomizer 12000 may include a vibrator 1300 that generates ultrasonic vibrations, a liquid delivery means 2400 that absorbs an aerosol generating material and maintains the aerosol generating material in an optimal state for converting into an aerosol, and a vibration accommodation unit 2300 that transmits ultrasonic vibrations to the aerosol generating material of the liquid delivery means 2400 to generate an aerosol.

The vibrator 1300 may generate short-cycle vibrations. The vibrations generated by the vibrator 1300 may include ultrasonic vibrations, and a frequency of the ultrasonic vibrations may be, for example, about 100 kHz to about 3.5 MHz. An aerosol generating material may be vaporized and/or divided into fine particles by the short-cycle vibrations generated by the vibrator 1300 to be atomized into an aerosol.

The vibrator 1300 may include, for example, piezoelectric ceramic that is a functional material which may convert electrical energy into mechanical energy or vice versa. Specifically, piezoelectric ceramic may generate electricity (i.e., voltage) when a physical force (i.e., pressure) is applied, and generate vibrations (i.e., mechanical force) when electricity is applied. Therefore, vibrations may be generated by electricity applied to the vibrator 1300, and physical vibrations may divide an aerosol generating material into fine particles such that the aerosol generating material is atomized into an aerosol.

The vibration accommodation unit 2300 may receive vibrations generated by the vibrator 1300 and converts an aerosol generating material transmitted from the liquid storage 2200 into an aerosol.

The liquid delivery means 2400 may deliver a liquid composition of the liquid storage 2200 to the vibration accommodation unit 2300. For example, the liquid delivery means 2400 may include a wick including at least one of cotton fiber, ceramic fiber, glass fiber, and porous ceramic but is not limited thereto.

The atomizer 12000 may also be implemented as a vibration accommodation unit having a mesh shape or a plate shape that performs a function of absorbing an aerosol generating material and maintaining the aerosol generating material in an optimal state for conversion into an aerosol without using a separate liquid delivery means, as well as a function of generating an aerosol by transmitting vibrations to the aerosol generating material.

In the embodiment of FIG. 2, the vibrator 1300 of the atomizer is arranged in the main body 1000, and the vibration accommodation unit 2300 and the liquid delivery means 2400 are arranged in the cartridge 2000. However, embodiments are not limited thereto. In another embodiment, the cartridge 2000 may include the vibrator 1300, the vibration accommodation unit 2300, and the liquid delivery means 2400, and when a part of the cartridge 2000 is inserted into the main body 1000, the main body 1000 may supply electric power to the cartridge 2000 through a terminal (not illustrated) or provide a signal for controlling an operation of the cartridge 2000 to the cartridge 2000.

At least a portion of the liquid storage 2200 of the cartridge 2000 may include a transparent material so that the aerosol generating material accommodated in the cartridge 2000 may be visually identified from the outside. A mouthpiece 2100 and the liquid storage 2200 may be entirely formed of transparent plastic or glass, and only a portion of the liquid storage 2200 may be formed of a transparent material.

The cartridge 2000 of the aerosol generating device 10000 may include an aerosol outlet passage 2500 and an airflow passage 2600.

The aerosol outlet passage 2500 may be formed in the liquid storage 2200 to be in fluid communication with the discharge hole 2110 of the mouthpiece 2100. Therefore, an aerosol generated by the atomizer 12000 may move along the aerosol outlet passage 2500 and may be delivered to a user through the discharge hole 2110 of the mouthpiece 2100.

External air may be introduced into the aerosol generating device 10000 through the airflow passage 2600. The external air introduced through the airflow passage 2600 may be introduced into the aerosol outlet passage 2500 or may be introduced into a space in which an aerosol is generated. Accordingly, the external air may be mixed with vaporized particles generated from the aerosol generating material, and thus an aerosol is generated.

For example, the airflow passage 2600 may be formed to surround the aerosol outlet passage 2500, as illustrated in FIG. 2. In this case, the aerosol outlet passage 2500 and the airflow passage 2600 may have a double tube shape in which the aerosol outlet passage 2500 is arranged on the inside and the airflow passage 2600 is arranged on the outside of the aerosol outlet passage 2500. Accordingly, external air may be introduced in a direction opposite to a direction in which an aerosol moves in the aerosol outlet passage 2500.

In addition, a structure of the airflow passage 2600 is not limited to structure described above. For example, the airflow passage may be a space which is formed between the main body 1000 and the cartridge 2000 when the main body 1000 is coupled to the cartridge 2000. The airflow passage 2600 may be in fluid communication with the atomizer 12000.

A horizontal cross-sectional shape of the aerosol generating device 10000 taken transverse to the longitudinal direction of the main body 1000 and the cartridge 2000 may be one of various shapes, such as a circular shape, an oval shape, a square shape, a rectangular shape, or a polygonal shape. However, the cross-sectional shape of the aerosol generating device 10000 is not limited to the shapes described above, and the aerosol generating device 10000 is not limited to a linearly extending structure when extending in the longitudinal direction. For example, the aerosol generating device 10000 may have a streamline shape or may have a region bent at a preset angle so that a user can easily hold the aerosol generating device 10000 by hand. Also, the cross-sectional shape of the aerosol generating device 10000 may vary along the longitudinal direction.

The frequency response of the vibrator 1300 may change. For example, the frequency response of the vibrator 1300 may change according to an operating environment of the vibrator 1300, resulting in the inconsistent amount of atomization. According to the present disclosure, even when there is a change in frequency response of the vibrator 1300, the constant amount of atomization may be provided to a user, and thus a user's sense of smoking may be improved.

The operating environment refers to variables that affect a vibrating operation of the vibrator 1300, such as a voltage and/or a current applied to the vibrator 1300, a temperature, a pressure, and humidity. The frequency response may refer to a correspondence relationship between a frequency of a voltage and/or a current supplied to the vibrator 1300 and the vibration performance of the vibrator 1300 such as a vibration speed or a vibration amplitude.

Hereinafter, a method of controlling the vibrator 1300 using a feedback method will be described with reference to the drawings.

Figure 3:
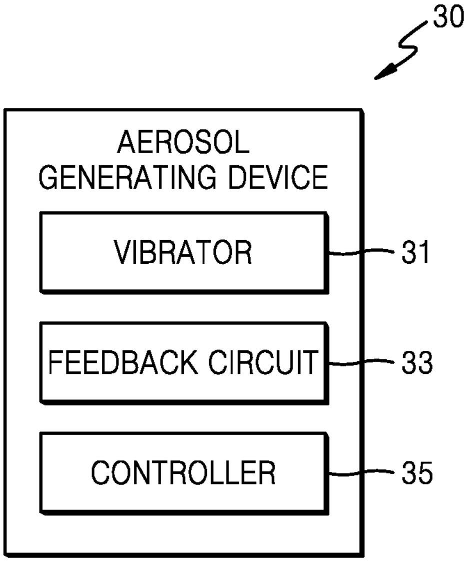
FIG. 3 is a block diagram of an aerosol generating device according to another embodiment.

FIG. 3 is a block diagram of an aerosol generating device according to another embodiment. Referring to FIG. 3, an aerosol generating device 30 may include a vibrator 31, a feedback circuit 33, and a controller 35. However, an internal structure of the aerosol generating device 30 is not limited to the structure illustrated in FIG. 3. Those skilled in the art related to the present embodiment may understand that some of hardware components illustrated in FIG. 3 may be omitted or new components may be added thereto according to a design of the aerosol generating device 30. The aerosol generating device 30, the vibrator 31, and the controller 35 of FIG. 3 may correspond to the aerosol generating device 10000 of FIG. 1, the vibrator 1300 of FIG. 2, and the processor 16000 of FIG. 1, respectively.

The vibrator 31 may generate an aerosol. For example, the vibrator 31 may vibrate to generate an aerosol from an aerosol generating material.

As the vibrator 31 vibrates, a temperature thereof may increase. For example, the vibrator 31 may convert a part of electrical energy into kinetic energy to vibrate at a certain vibration speed. The vibrator 31 may convert the rest of the electrical energy into thermal energy to increase a temperature. The vibrator 31 may convert electrical energy into kinetic energy and thermal energy. The thermal energy may correspond to the electrical energy that is not converted into kinetic energy. The thermal energy may be frictional heat, Joule heat, or so on.

For example, the vibrator 31 may vibrate to control a temperature of an aerosol generating material. The vibrator 31 may vibrate by receiving a certain voltage with a certain frequency, and thus a temperature of an aerosol generating material may be controlled by the vibration energy transmitted to the aerosol generating material.

The aerosol generating material may be vibrated by the vibrator 31 to increase a temperature to a preset temperature for generating an aerosol. For example, when an aerosol generating material is in a viscous liquid form, the viscosity of the aerosol generating material may be reduced by increasing a temperature of the aerosol generating material to a preset temperature to generate an aerosol. Accordingly, the atomization of the aerosol generating material may occur more quickly, resulting in the increased amount of vapor.

The vibrator 31 may vibrate at a target vibration speed. The target vibration speed may be preset to correspond to various functions and purposes of the aerosol generating device 30. For example, the target vibration speed may be set to a value that heats the vibrator 31 to a temperature for generating an aerosol, a value that causes the amount of atomization desired by a user, or a value that heats the vibrator 31 to a preheating temperature.

The feedback circuit 33 may output a feedback signal. For example, the feedback circuit 33 may detect an electrical signal representing a frequency response of the vibrator 31 that change according to an operating environment of the vibrator 31 and may output a feedback signal based on the electrical signal. The controller 35 may control a vibration speed of the vibrator 31 to maintain a target vibration speed by using the output feedback signal.

The frequency response of the vibrator 31 may change according to an operating environment of the vibrator 31. The vibrator 31 may have electrodes or electrode plates facing each other for a vibration operation and may be thought of as a capacitor among impedance models. Thus, the vibrator 31 may have a capacitance value. The capacitance value of the vibrator 31 may change as a temperature of the vibrator 31 increases. For example, the change in the capacitance value of the vibrator 31 may correspond to thermal energy released by the vibrator 31. The capacitance value of the vibrator 31 may increase as the temperature of the vibrator 31 increases.

The change in the capacitance value of the vibrator 31 may affect the frequency response of the vibrator 31. For example, when the capacitance value increases according to an increase in temperature of the vibrator 31, the frequency response of the vibrator 31 may be affected. For example, a resonant frequency of the vibrator 31 may change.

The above description is focused on capacitance of the vibrator 31, but the vibrator 31 may further have an inductance value and/or a resistance value. Also, the vibrator 31 may be modeled by various combinations of a capacitor, an inductor, and a resistor.

The feedback circuit 33 may detect an electrical signal that changes according to a temperature of the vibrator 31 that changes as the vibrator 31 vibrates. For example, the feedback circuit 33 may detect an electrical signal that changes in proportion to the temperature of the vibrator 31 that changes as the vibrator 31 vibrates. As the vibrator 31 vibrates, the temperature of the vibrator 31 may change, and as the temperature changes, the impedance of the vibrator 31 may change. As the impedance of the vibrator 31 changes, the feedback circuit 33 electrically connected to the vibrator 31 may detect a voltage and/or a current that changes accordingly.

The electrical signal may change according to a change in temperature of the vibrator 31. For example, as a temperature change of the vibrator 31 increases, a change of a voltage and/or a current may increase.

The feedback circuit 33 may be implemented by using various types of hardware. For example, the feedback circuit 33 may be implemented by using a current sense amplifier that detects a voltage and/or a current of a circuit connected to the vibrator 31.

However, hardware that may be utilized for feedback is not limited to the current sense amplifier described above. For example, examples of the hardware that may be utilized for feedback may include a temperature sensor, a pressure sensor, and a humidity sensor. The temperature sensor may detect a temperature of the vibrator 31 and immediately feed the temperature to the controller 35. The controller 35 may adjust a vibration speed of the vibrator 31 to a target vibration speed by using a current temperature of the vibrator 31.

The controller 35 may control the vibrator 31 to vibrate at a target vibration speed. For example, the controller 35 may control the vibrator 31 to vibrate at a target vibration speed by applying a voltage vibrating at an operating frequency corresponding to the target vibration speed to the vibrator 31.

The controller 35 may set an initial frequency of a voltage supplied to the vibrator 31 to a value (hereinafter "initial operating frequency") that corresponds to a target vibration speed according to the frequency response of the vibrator 31. The controller 35 may control a voltage of the initial operating frequency to be supplied to the vibrator 31.

However, the frequency response of the vibrator 31 may change as a voltage of an initial operating frequency is supplied to the vibrator 31. For example, a temperature of the vibrator 31 may increase as the vibrator 31 continuously vibrates according to the voltage of an initial operating frequency, and thus the frequency response of the vibrator 31 may be changed. As a result, the vibrator 31 may not vibrate at a target vibration speed, and vibration performance or atomization performance thereof may be reduced.

According to an embodiment, the controller 35 may control the vibrator 31 to vibrate at a target vibration speed by adjusting a frequency of a voltage supplied to the vibrator 31 to a value (hereinafter "feedback operating frequency") that is determined based on the feedback signal received from the feedback circuit 33. Accordingly, the vibration speed of the vibrator 31 may be maintained at the target vibration speed despite a change in operating environment.

In other words, the controller 35 may change an initial operating frequency to a feedback operating frequency. The controller 35 may acquire a feedback signal from the feedback circuit 33 and change the initial operating frequency to the feedback operating frequency based on the feedback signal such that the vibrator 31 vibrates at the target vibration speed.

For example, the controller 35 may determine a feedback operating frequency based on a correlation between a feedback signal and a feedback operating frequency. For example, assume that a target vibration speed is v1, and the feedback signals fs1, fs2, fs3, and fs4 responds to the feedback operating frequencies f1, f2, f3, and f4, respectfully, according to a correlation between a feedback signal and a feedback operating frequency. The controller 35 may use a correlation between a feedback signal and a feedback operating frequency to control vibrations of the vibrator 31 to vibrate at the target vibration speed v1.

For example, the controller 35 may determine the feedback operating frequency of the vibrator 31 as f1 when the feedback signal of fs1 is acquired, determine the feedback operating frequency of the vibrator 31 as f2 when the feedback signal of fs2 is acquired, determine the feedback operating frequency of the vibrator 31 as f3 when the feedback signal of fs3 is acquired, and determine the feedback operating frequency of the vibrator 31 as f4 when the feedback signal of fs4 is acquired.

The correlation between the feedback signal and the feedback operating frequency may be experimentally, empirically, or mathematically measured in advance and stored in a memory of the aerosol generating device 30. The correlation between the feedback signal and the feedback operating frequency may be stored in the memory in the form of a table, an equation, a matching table, or so on. The controller 35 may determine the feedback operating frequency by referring to the correlation between the feedback signal stored in the memory and the feedback operating frequency.

The controller 35 may generate a clock signal of a constant frequency. The controller 35 may control the aerosol generating device 30 to perform various control operations based on the clock signal. For example, the controller 35 may output a pulse width modulation (PWM) signal based on a clock signal of a constant frequency. Here, the constant frequency may be about 80 MHz to about 160 MHz.

The controller 35 may output PWM signals of various frequencies based on a clock signal of a constant frequency. The PWM signals of various frequencies may have different resolutions according to magnitudes of a constant frequency.

As the frequency of the clock signal increases, the resolution may be increased. For example, a controller 35 that generates a clock signal of 160 MHz may output a plurality of PWM signals having smaller frequency differences than a controller 35 that generates a clock signal of 80 Mhz. As the frequency difference between the PWM signals becomes smaller, the frequency resolution of the aerosol generating device 30 may increase.

Although it is described that the controller 35 outputs a PWM signal, the aerosol generating device 30 may include a separate PWM signal output circuit for outputting the PWM signal. The controller 35 may be connected to the PWM signal output circuit to control the PWM signal output circuit to output the PWM signal. For example, the PWM signal output circuit may include a digital function generator, and the digital function generator may output a plurality of PWM signals having a frequency interval of about 0.02 Hz to about 0.06 Hz.

However, a method by which the aerosol generating device 30 outputs a PWM signal is not limited to the method described above. For example, the PWM signal may be output from the controller 35, output from a separate PWM signal output circuit, simultaneously output from the controller 35 and the PWM signal output circuit, or selectively output from one of the controller 35 and the PWM signal output circuit depending on situations.

Figure 4:
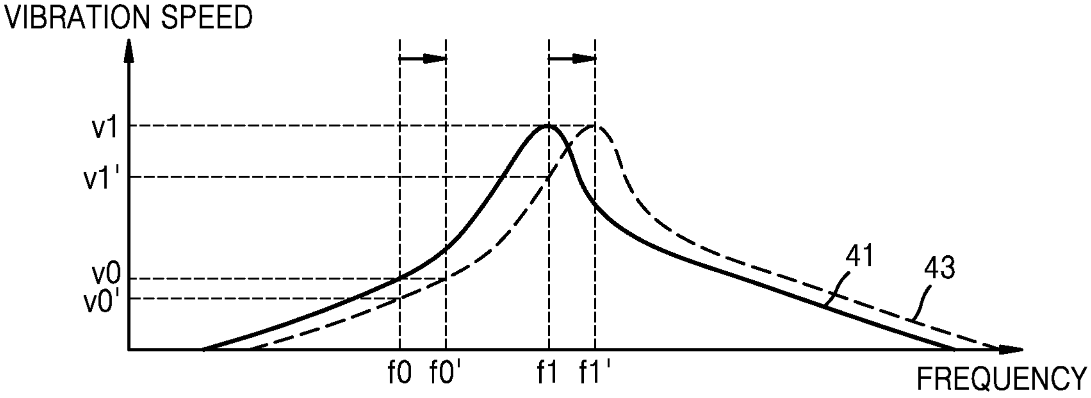
FIG. 4 is a graph showing a frequency response of a vibrator according to an embodiment.

FIG. 4 is an example graph illustrating a frequency response of the vibrator according to an embodiment. Referring to FIG. 4, a first graph 41 represents a frequency response at a first point in time, and a second graph 43 represents a frequency response at a second point in time following the first point in time, in which feedback is reflected.

Referring to the first graph 41, the controller 35 may provide f1 to the vibrator 31 as an initial operating frequency of the voltage supplied to the vibrator 31, at the first point in time, to vibrate the vibrator 31 at a vibration speed of v1. For example, v1 may be a maximum vibration speed of the vibrator 31. The maximum vibration speed may be for generating an aerosol. For example, f1 may be a resonant frequency.

As the vibrator 31 vibrates, the frequency response of the vibrator 31 may change as illustrated by the second graph 43. In this case, with the initial operating frequency of f1, a vibration speed may be reduced to v1'. In order to vibrate the vibrator 31 at a vibration speed of v1, the controller 35 may receive a feedback signal from the feedback circuit 33 and provide a feedback operating frequency of f1' to the vibrator 31 to maintain the vibration speed at v1.

As another example, referring to the first graph 41, the controller 35 may provide f0 to the vibrator 31 as an initial operating frequency at a first point in time to vibrate the vibrator 31 at a vibration speed of v0. For example, v0 may be a vibration speed for preheating the vibrator 31.

As the vibrator 31 vibrates, the frequency response of the vibrator 31 may change as illustrated by the second graph 43. In this case, with an initial operating frequency of f0, the vibration speed may be reduced to v0'. In order to vibrate the vibrator 31 at a vibration speed of v0, the controller 35 may receive a feedback signal from the feedback circuit 33 and provides a feedback operating frequency of f0' to the vibrator 31 to maintain the vibration speed at v0.

According to an embodiment, the controller 35 may reflect feedback when a target vibration speed is a vibration speed for generating an aerosol and may not reflect the feedback when the target vibration speed is a vibration speed for preheating an aerosol generating material.

For example, when the target vibration speed is a vibration speed for generating an aerosol, an operating voltage may be provided to the feedback circuit 33 to output a feedback signal, and when the target vibration speed is a vibration speed for preheating an aerosol generating material, the operating voltage may not be provided to the circuit 33.

In the case of the vibration speed v0 for preheating an aerosol generating material, a temperature change of the vibrator 31 may be small compared to the temperature change in the case of the vibration speed v1 for generating an aerosol, and a user may not inhale an aerosol during preheating. In this respect, the controller 35 may efficiently operate electric power of the aerosol generating device 30 by continuously reflecting feedback to maintain a target vibration speed only when a target vibration speed is a vibration speed for generating an aerosol.

Figure 5:
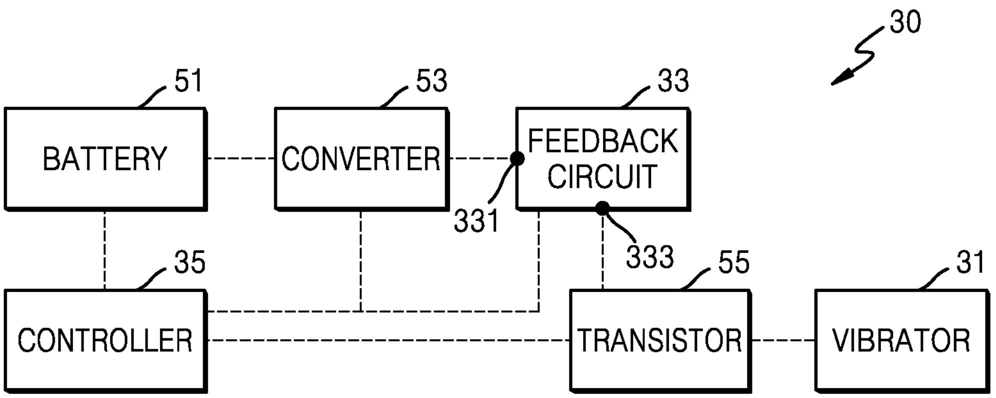
FIG. 5 is a diagram illustrating a connection of a feedback circuit according to an embodiment.

FIG. 5 is a diagram illustrating a connection of a feedback circuit according to an embodiment. Referring to FIG. 5, the aerosol generating device 30 may further include a battery 51, a converter 53, and a transistor 55. The battery 51 of FIG. 5 may correspond to the battery 11000 of FIG. 1.

The converter 53 may perform a DC-DC conversion of a voltage provided from the battery 51 to output a supply voltage for the vibrator 31. For example, when a voltage of the battery 51 is about 3.6 V to about 4.2 V, the converter 53 may supply a voltage of about 20 V to about 40 V to the vibrator 31 in response to a converter control signal provided by the controller 35.

The converter 53 may control the supply voltage supplied to the vibrator 31 in response to the converter control signal generated by the controller 35. The supply voltage output from the converter 53 may be supplied to the vibrator 31 through the transistor 55.

As the supply voltage supplied to the vibrator 31 increases, a temperature of an aerosol generating material and/or a temperature of the vibrator 31 may increase. For example, as the supply voltage supplied to the vibrator 31 further increases, the vibration strength may increase, and thus the temperature may also increase.

The transistor 55 may provide the supply voltage provided by the converter 53 to the vibrator 31. For example, the transistor 55 may perform an on-off operation according to a frequency of a pulse width modulation (PWM) signal output from the controller 35 and apply the supply voltage according to the frequency of the PWM signal to the vibrator 31.

The transistor 55 may include a field effect transistor (FET), a metal oxide semiconductor field effect transistor (MOSFET), or a power MOSFET, but is not limited thereto.

The feedback circuit 33 may detect an electrical signal between the converter 53 and the transistor 55. For example, the feedback circuit 33 may be connected between the converter 53 and the transistor 55 to detect a voltage and/or a current supplied from the converter 53 to the transistor 55. For example, since the vibrator 31 is electrically connected to the vibrator 31, if impedance of the vibrator 31 changes, the voltage and/or the current between the transistor 55 and the converter 53 may also change. The feedback circuit 33 may detect a change in voltage and/or current between the converter 53 and the transistor 55, and output a feedback signal based on the change.

The feedback circuit 33 may include a first connection terminal 331 and a second connection terminal 333. The feedback circuit 33 may detect a voltage difference between the first connection terminal 331 and the second connection terminal 333 and/or may detect a current flowing from the first connection terminal 331 to the second connection terminal 333.

Figure 6:
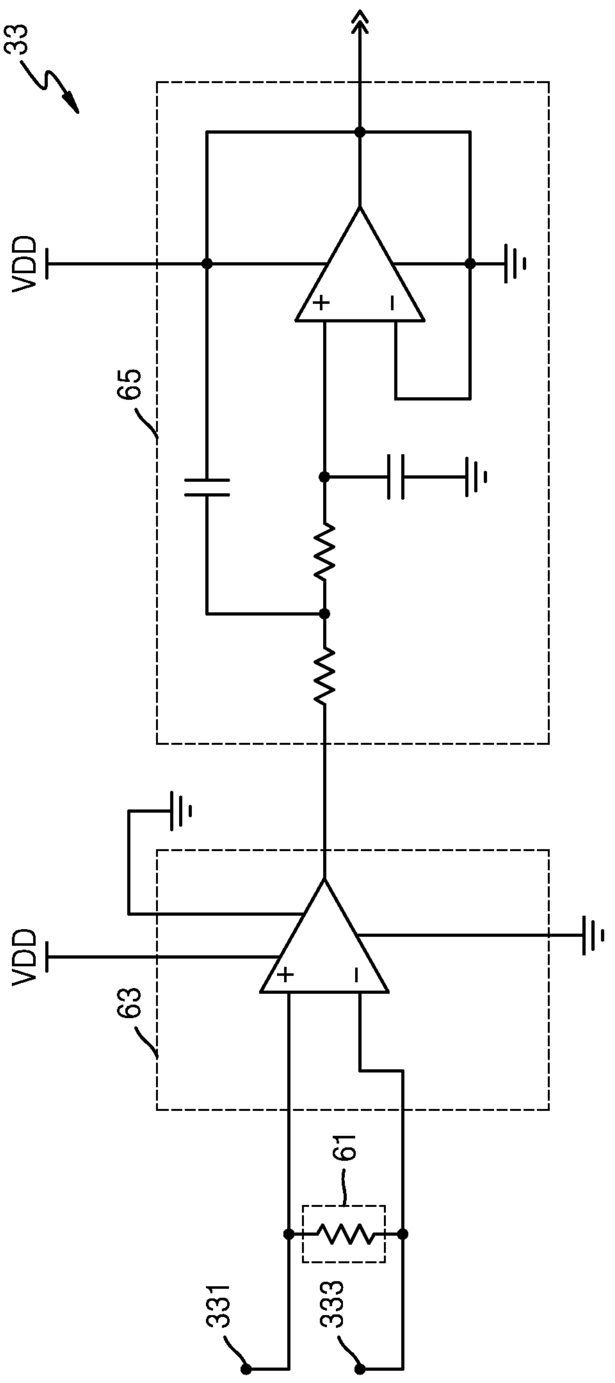
FIG. 6 is a circuit diagram of a feedback circuit according to an embodiment.

FIG. 6 is a circuit diagram of a feedback circuit according to an embodiment. Referring to FIG. 6, the feedback circuit 33 may include a detector 63 and an amplifier 65.

The detector 63 may detect an electrical signal by outputting a voltage proportional to a voltage difference between the first connection terminal 331 and the second connection terminal 333. For example, a constant supply voltage output from the converter 53 may be applied to the first connection terminal 331, and a voltage that changes according to an impedance change of the vibrator 31 may be applied to the second connection terminal 333. The detector 63 may output a voltage and/or a current proportional to a difference between a constant supply voltage of the first connection terminal 331 and a changing voltage of the second connection terminal 333. A voltage and/or a current proportional to the voltage difference may be a feedback signal output from the feedback circuit 33.

The voltage and/or the current proportional to the voltage difference may be modified by certain processing before being output as the feedback signal. For example, the amplifier 65 may output the feedback signal by amplifying the voltage and/or the current proportional to the voltage difference. The controller 35 may determine a feedback operating frequency by acquiring an amplified voltage and/or an amplified current from the feedback circuit 33. By acquiring the amplified voltage and/or the amplified current from the feedback circuit 33, the controller 35 may more accurately determine a feedback operating frequency.

The aerosol generating device 30 may include a resistor 61. The resistor 61 may be connected in series to the converter 53 and the transistor 55. For example, the resistor 61 may be connected between the first connection terminal 331 connected to the converter 53 and the second connection terminal 333 connected to the transistor 55. Accordingly, the resistor 61 may induce a voltage drop and may allow a current to flow from the converter 53 to the transistor 55.

The feedback circuit 33 may detect an electrical signal by being connected in parallel to the resistor 61. For example, the detector 63 may detect a voltage difference between both ends of the resistor 61. As another example, the detector 63 may detect a current flowing through the resistor 61.

Figure 7:
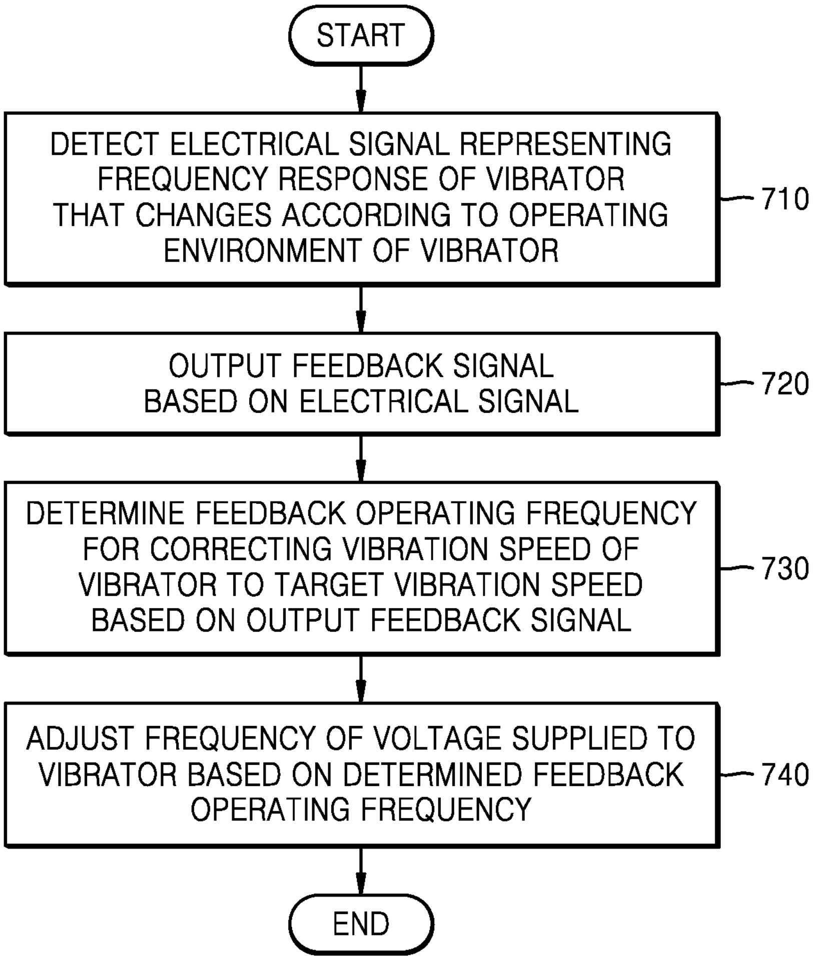
FIG. 7 is a flowchart illustrating a method of operating an aerosol generating device, according to an embodiment.

FIG. 7 is a flowchart of a method of operating an aerosol generating device, according to an embodiment. Referring to FIG. 7, the method of operating an aerosol generating device includes steps processed by an aerosol generating device (for example, 10000 in FIG. 1, and 30 in FIG. 3) described above. Accordingly, even if omitted in the following description, the descriptions given with reference to the drawings may be applied to the method of FIG. 7 as well.

In step 710, the feedback circuit 33 may detect an electrical signal representing the frequency response of the vibrator 31 that changes according to an operating environment of the vibrator 31.

In step 720, the feedback circuit 33 may output a feedback signal based on the detected electrical signal.

In step 730, the controller 35 may determine a feedback operating frequency for correcting a vibration speed of the vibrator 31 to a target vibration speed based on the output feedback signal.

In step 740, the controller 35 may correct the vibration speed of the vibrator 31 to the target vibration speed by adjusting a frequency of a voltage supplied to the vibrator 31 based on the determined feedback operating frequency.

In addition, the embodiments described above may be implemented by a program that may be executed on a computer and may be implemented by a general-purpose digital computer that operates the program by using a non-transitory computer-readable recording medium. In addition, a structure of data used in the embodiments described above may be recorded in a computer-readable recording medium by various means. The computer-readable recording medium includes a storage medium such as a magnetic storage medium (for example, read-only memory (ROM)), a floppy disk, a hard disk, or so on) or an optically readable medium (for example, a compact disc (CD)-ROM, a digital video disc (DVD), or so on).

Those of ordinary skill in the art related to the present embodiments may understand that various changes in form and details can be made therein without departing from the scope of the characteristics described above. The disclosed methods should be considered in a descriptive sense only and not for purposes of limitation. The scope of the disclosure should be defined by the appended claims, and all differences within the scope equivalent to those described in the claims will be construed as being included in the scope of protection defined by the claims.

The invention claimed is:

1. An aerosol generating device comprising:

a vibrator configured to vibrate at different vibration speeds according to a frequency of a supply voltage to generate an aerosol from an aerosol generating material;

a feedback circuit configured to detect an electrical signal representing a frequency response of the vibrator that changes according to an operating environment of the vibrator, and output a feedback signal based on the detected electrical signal;

a controller configured to adjust, in response to a change in the frequency response of the vibrator, the frequency of the supply voltage based on the feedback signal such that the vibrator vibrates at a target vibration speed to generate the aerosol from the aerosol generating material;

a battery;

a converter configured to convert a first direct current (DC) voltage supplied from the battery to a second DC voltage; and a transistor configured to generate the supply voltage for the vibrator by performing an on-off operation on the second DC voltage according to a frequency of a pulse width modulation (PWM) signal output from the controller, wherein the feedback circuit includes a first connection terminal connected to the converter and a second connection terminal connected to the transistor, and outputs a voltage proportional to a voltage difference between the first connection terminal and the second connection terminal as the electrical signal.

2. The aerosol generating device of claim 1, wherein the electrical signal changes according to a temperature of the vibrator.

3. The aerosol generating device of claim 2, wherein the temperature of the vibrator rises by vibration of the vibrator.

4. The aerosol generating device of claim 1, wherein the feedback circuit outputs the feedback signal by amplifying the voltage proportional to the voltage difference between the first connection terminal and the second connection terminal.

5. The aerosol generating device of claim 1, wherein a resistor is connected between the converter and the transistor in series, and wherein the feedback circuit detects the electrical signal based on at least one of a voltage across the resistor and a current flowing through the resistor.

6. The aerosol generating device of claim 1, wherein the controller provides an operating voltage to the feedback circuit to output the feedback signal when the target vibration speed is a first vibration speed for generating the aerosol, and stops supplying the operating voltage to the feedback circuit when the target vibration speed is a second vibration speed for preheating the aerosol generating material.

7. The aerosol generating device of claim 1, wherein the controller adjusts the frequency of the supply voltage based on a predetermined correlation between the feedback signal and the frequency of the supply voltage.

* * * * *